US010041725B2

(12) United States Patent
Olson et al.

(10) Patent No.: US 10,041,725 B2
(45) Date of Patent: Aug. 7, 2018

(54) MOBILE CABINET WITH INSULATION

(71) Applicant: InterMetro Industries Corporation, Wilkes-Barre, PA (US)

(72) Inventors: Jeffrey Olson, Dallas, PA (US); Wilhelm Heinrich, White Haven, PA (US); Willard Sickles, Dalton, PA (US); James Dube, Scranton, PA (US)

(73) Assignee: INTERMETRO INDUSTRIES CORPORATION, Wilkes-Barre, PA (US)

(*) Notice: Subject to any disclaimer, the term of this patent is extended or adjusted under 35 U.S.C. 154(b) by 0 days.

(21) Appl. No.: 15/044,676

(22) Filed: Feb. 16, 2016

(65) Prior Publication Data

US 2016/0238303 A1 Aug. 18, 2016

Related U.S. Application Data

(60) Provisional application No. 62/117,332, filed on Feb. 17, 2015.

(51) Int. Cl.
A47J 39/00 (2006.01)
F25D 23/06 (2006.01)
A47B 31/02 (2006.01)

(52) U.S. Cl.
CPC ............ F25D 23/063 (2013.01); A47B 31/02 (2013.01); A47J 39/006 (2013.01); F25D 2400/20 (2013.01)

(58) Field of Classification Search
CPC ....... F25D 23/063; A47B 31/02; A47B 31/04; A47B 47/042; A47B 47/047; A47J 39/006

USPC .......... 312/400, 406, 257.1, 258, 262, 249.8
See application file for complete search history.

(56) References Cited

U.S. PATENT DOCUMENTS

| 6,460,955 | B1* | 10/2002 | Vaughan | B29C 66/4326 312/236 |
| 2002/0005424 | A1* | 1/2002 | Lange | B60R 7/04 224/539 |
| 2002/0125799 | A1* | 9/2002 | Landsberger | A47B 47/0091 312/209 |
| 2003/0160551 | A1 | 8/2003 | Beyer et al. | |
| 2005/0223652 | A1 | 10/2005 | Mower et al. | |
| 2006/0108899 | A1 | 5/2006 | Jin | |
| 2007/0235362 | A1* | 10/2007 | Lewis | B65D 43/162 206/470 |
| 2008/0284302 | A1 | 11/2008 | Olson et al. | |
| 2013/0126544 | A1 | 5/2013 | Klem et al. | |

OTHER PUBLICATIONS

International Search Report and Written Opinion in International Application No. PCT/US2016/018069, dated Apr. 21, 2016.

* cited by examiner

Primary Examiner — James O Hansen
(74) Attorney, Agent, or Firm — Harness, Dickey & Pierce, P.L.C.

(57) ABSTRACT

A mobile cabinet may include a cabinet body, a door, a heating or refrigeration module, and at least one attachable insulation panel. The insulation panel may be a single panel, or a plurality of panels, to provide insulation for the cabinet. The insulation panel may include a hinge to couple multiple wall sections that can be attached to different walls of the cabinet and integral hand holds.

10 Claims, 10 Drawing Sheets

SECTION A-A

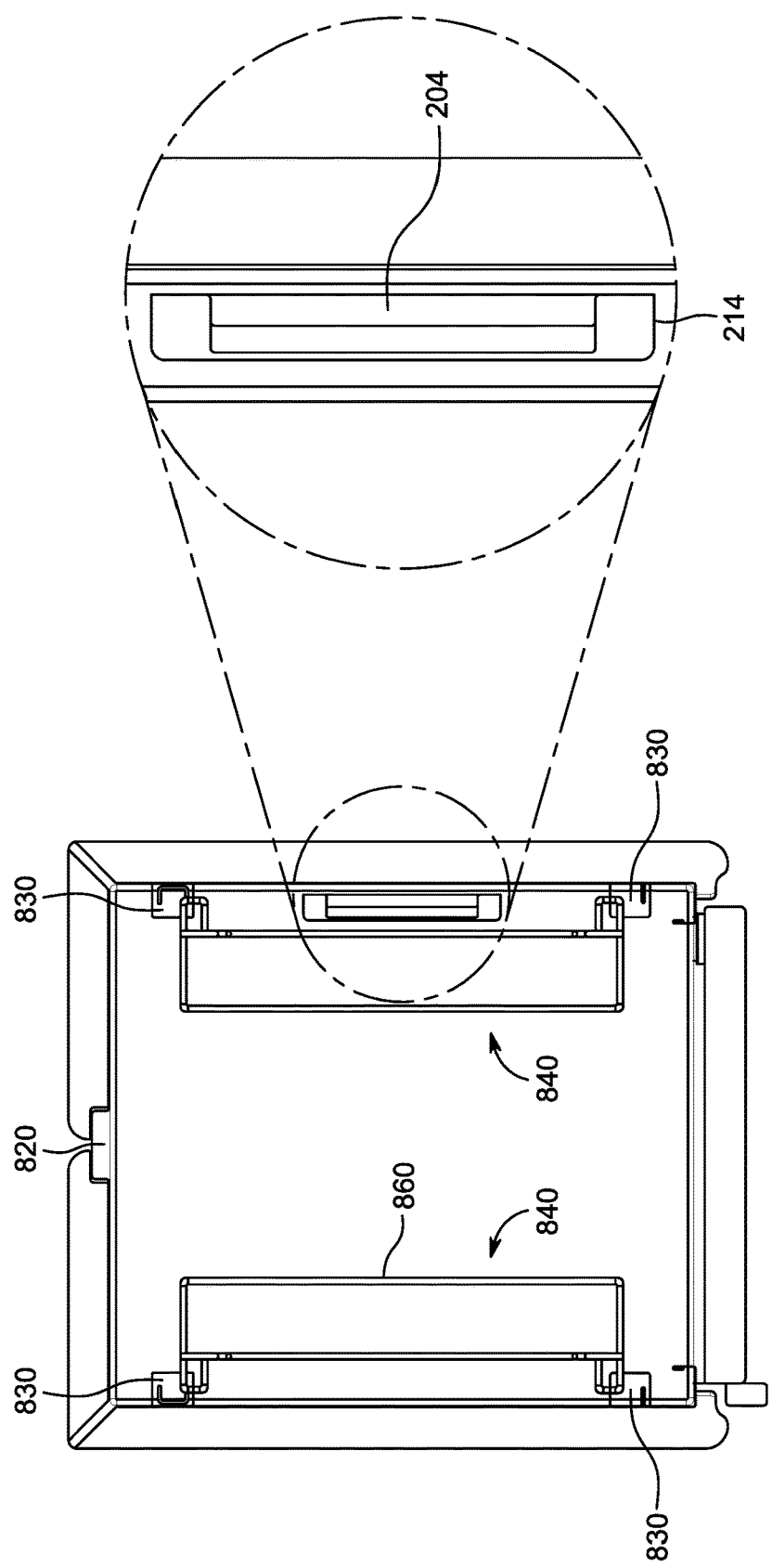

MOBILE CABINET WITH INSULATION

BACKGROUND OF THE INVENTION

Field of the Invention

The present invention relates generally to mobile cabinets with insulation.

Background

For restaurants, schools, hospitals, etc. where food and drink are served, it is often not possible for a kitchen to prepare enough servings from scratch to feed everyone within a reasonable time period. Accordingly, food and drink items are prepared ahead of time and stored until served. To ensure that items do not perish or reach an undesired temperature, they are typically stored in mobile or stationary cabinets. The food is prepared and loaded into the cabinets, which are plugged into an electrical outlet so that internal heating systems can heat, or refrigeration system can cool, the interior of the cabinet. Mobile cabinets can be moved to facilitate cleaning the floor underneath them. Similar cabinets may also be used in hospitals, schools or other environments where meals are prepared at a central location and substantial time may lapse before they are ultimately delivered to the intended destinations, e.g. remote patient rooms.

Traditionally, holding cabinets fell into two general categories related to performance: insulated and un-insulated. Un-insulated cabinets generally fall into a "budget" category of cabinet, are inefficient, and may have hot exteriors. Insulated cabinets are typically manufactured by creating inner and outer sheet metal shells, with some form of insulation between them. These cabinets may provide good insulation performance and structure, but the process of manufacturing them is time consuming. Most insulated cabinets employed a fiberglass bat or board insulation that was easier, and less expensive to assemble, but the insulation could absorb moisture over time, losing its efficacy. In addition cabinets with metal outer surfaces are susceptible to denting, scratching, and require bumpers to be added to prevent damage to the cabinet or to the facility itself when moving the cabinet.

The conventional un-insulated cabinets have several other drawbacks. The metal exteriors of these cabinets transfer heat, and may lead to user burns. In addition, moving the cabinets inevitably results in bumps and vibrations which can harm the exterior of the cabinets or interior mechanical systems. Some cabinets have addressed these problems with padded and/or insulated hand holds, but these hand holds usually leave many exposed surfaces, including surfaces near the front of the cabinets that may lead to user burns.

Consequently, it would be advantageous to provide a cost-effective mobile cabinet which addresses the problems arising from a lack of expensive integrated insulation. It would also be advantageous to provide a mobile cabinet with insulation that protects the cabinet from harmful bumps and vibrations. In addition, it would be advantageous to design a mobile cabinet where the user is protected from possible burns through improved safety. In addition, it is also be advantageous to provide a mobile cabinet that complies with ENERGY STAR® requirements.

SUMMARY OF THE INVENTION

The present invention provides a mobile cabinet with an attachable insulation panel system.

In one embodiment, the mobile cabinet may include a cabinet body, a door, a heating or refrigeration module, and at least one attachable insulation panel. The insulation panel may be a single panel which is formable around the entire cabinet, or a plurality of panels may be used to provide insulation for the cabinet to allow the cabinet to comply with ENERGY STAR® requirements, by improving the amount of coverage of an inner shell, reducing exposed hot areas, improving safety and efficiency. The insulation panel may also provide integral hand holds that allow easier moving and handling.

In a preferred embodiment, the insulation for the cabinet may be a system of panels. The system of panels is preferably between two and four insulation panels. For small size cabinets, the system of panels is preferably two panel sections, which each wrap the cabinet from a front corner to at least a middle of the back of the cabinet, in an L-shape. In a preferred embodiment, the insulation panel sections are coupled by a hinge. For larger size cabinets, the system of panels is preferably four insulation panels, which each wrap either the top or bottom part of the cabinet from a front corner of the cabinet to at least the middle of the back of the cabinet, in an L-shape. A plurality of panels can be mounted on each side of the cabinet. In another preferred embodiment, the insulation panel may have three sections connected by two hinges, such that the insulation panel can wrap around three sides of the cabinet.

The insulation panels preferably include a side wall section and a back wall section. The side wall section provides insulation to the side wall from the front of the cabinet near the door to the back of the cabinet. The back wall section provides insulation to the back of the cabinet and may extend from the back of the side wall to about the center of the rear wall of the cabinet.

The insulation panel may be formed with a side wall section that substantially covers the side wall of the cabinet and a back wall section that covers about half (or a portion) of the back wall of the cabinet. With such a construction, two hinged insulation panels can wrap the cabinet body from the position of the door back to a position where the panels meet near the center of the back wall of the cabinet.

The hinged panels may be formed to wrap around the entire cabinets, or multiple hinged panels may be used together in order to surround the cabinet. The hinge may be formed as an integral part of the panel. In a preferred embodiment, the hinge may be a double living hinge that is formable during a blow molding process. A single panel may be used to surround only half of the cabinet. The hinged panel may also include a single hinge or a plurality of hinges. The hinge may also be omitted from the design. That is, the insulation panels may be formed as a series of panels without hinges that may be secured to each other, or as a single panel with a plurality of hinges that allows the panel to bend around both rear corners of the cabinet. An extruded insert may also be used to couple multiple panels together.

In a preferred embodiment, the insulation panel includes a flange that is formed to extend substantially perpendicular to the length of the panel. The flange may extend from a position proximate to a front edge of a side wall section. The flange may be formed to provide coverage to the front portion of the cabinet proximate to the door. The flange may include openings for securing the panel to the cabinet with screws or other securing members. The flange provides additional insulation for the cabinet and protection to the user of the cabinet.

The insulation panels may be fastened to a single-walled cabinet to create a high-performance insulated cabinet with improved aesthetics and usability. The insulation panels may be attached to the cabinet using screws from the interior of the cabinet. The insulation panels may also be attached to the cabinet through mounting portions formed in the insulation panels. Mounting portions are preferably provided in the flange to secure the panel to the front of the cabinet.

Mounting portions may also be provided in the back wall section of the insulation panel, to attach the insulation panels to the rear of the cabinet, preferably near the edge of the back wall section. In a preferred embodiment, the cabinet is provided with a raised channel on the back of the cabinet. The raised channel preferably runs down the center of the back and allows the insulation panels to be secured thereto without penetrating the back of the cabinet. Screws that penetrate the cabinet walls may create a leak of thermal energy and/or create a dirt trap in the food storage space. As such, the raised channel allows the insulation panels to be secured to the cabinet without affecting the R value of the cabinet. In a more preferred embodiment, the back wall section of the insulation panel includes a cutout to accommodate the raised channel. The cutout is preferably shaped to allow the insulation panels to be secured flush to the raised channel.

The insulation panels may be provided in multiple sizes, which are usable together with cabinets of different heights. The insulation panels may be provided to In a preferred embodiment, the insulation panels are between 18 and 32 inches in height. In a more preferred embodiment, the insulation panels are between 19 and 29 inches in height.

In order to provide the best insulation and protection, it is preferable that the insulation panel be as thick as possible. However, the insulation panel should not be made thicker than necessary, which would result in wasted materials and a cabinet that is difficult to pass around obstacles or through doorways. Preferably, the maximum thickness of the insulation panel is between 1.5 and 3 inches. In a preferred embodiment, the maximum thickness of the insulation panel is between 1.7 and 2.75 inches. In a more preferred embodiment, the maximum thickness of the insulation panel is between 1.8 and 2.2 inches.

Of course, the thickness of the panel may vary throughout the width of the panel to accommodate aesthetic design features or functional enhancements to the insulation panel. The panel may include a hand hold or a plurality of hand holds. The hand holds may be formed in the panel by defining a depression along the height of the insulation panel, proximate to the front corner of the side panel. Preferably, the handholds may be formed only on the front side of the insulation panel, or on both the front and rear sides of the insulation panel on the side of the cabinet. Additional hand holds may be formed in the insulation panel on the back of the cabinet. Preferably, the depth of the hand holds is no more than half the maximum thickness of the insulation panel.

The insulation panels may be formed from a blow-molding process. In a preferred embodiment, the insulation panels are multi-part panels and the blow molding process is used to form an outer shell of the insulation panels. The insulation panel shells may be filled with an insulation material. The insulation panel shells are preferably formed of thermoplastic polymer, such as polyethylene, polypropylene, or other olefin materials. In addition, the insulation panels are preferably formed as a shell that may be filled with insulation. In a preferred embodiment, the insulation panel is manufactured as a flat, unfolded panel that is deformable. That is, the panel is preferably formed substantially in one plane, with a hinge that allows the panel to be secured to at least two different sides of a cabinet. The insulation panels are preferably formed in a vertical orientation, in order to align the grain of the thermoplastic polymer in the hinge portion and maximize the strength of the insulation panels. The thermoplastic polymer shells may then be stored as sheets for later filling with insulation and/or installation onto a cabinet and/or transportation within or between manufacturing facilities.

Alternatively, the insulation panels may also be formed through a rotational molding process. The rotational molding process may be used to form an outer shell by rotating a heated hollow mold. As another alternative, a sheet molding may be used. The sheet molding process may be used to create a shell including at least an inner shell portion and an outer shell portion. The sheet molded shell portions can then be applied to preformed insulation sheets.

The insulation panel shells may be filled with insulation. In a preferred embodiment, the shells are filled with polyurethane foam or an expanded polypropylene (EPP) using a process such as a JSP FOAMCORE process. The polyurethane foam may be filled into previously molded insulation panel shells. The filled shells may be stored and transported in an unfolded state, to maximize space utilization prior to the installation of the panel onto a cabinet. Alternatively, the shells may also be filled with fiberglass insulation. As yet another alternative, the entire insulation panel may be formed using an expanded polypropylene (or similar material), without a secondary material.

The cabinet body includes four side defined by three or more walls which may be formed of at least one layer of sheet metal. Preferably, the walls of the cabinet body are formed by multiple layers of sheet metal. The multiple layers of sheet metal may include an inner layer and an outer layer, with a cavity (or gap) therebetween. The cavity between the walls may be filled or provided with insulation. Most preferably, the cabinet body is mobile, and is provided with wheels or casters on the bottom of the cabinet.

The heating or refrigeration system is a modular unit provided on the top or bottom of the cabinet, which provides heating or cooling to the cabinet through blown air. Alternatively, the cabinet may be provided without a heating or refrigeration system. Such a cabinet may include another insulation panel on the top of the cabinet, or may include an air movement system for maintaining uniform air temperatures throughout the cabinet without additional heating or cooling. In a preferred embodiment, the heating or refrigeration module includes a sheet metal cover. The cover is preferably formed to extend past the base of the heating or refrigeration module to act as a panel securing member. The panel securing member may be formed to cover the top edge of a panel and hold the top edge of the panel against the cabinet body.

The cabinet may also include at least one chimney along the sides or back of the cabinet to allow air to be moved from the top to bottom of the cabinet or, if the cabinet is provided with a bottom mounted heating or cooling module, to allow air to be moved from the bottom to the top of the cabinet. In a more preferred embodiment, the chimney is provided on both sides of the cabinet.

In a preferred embodiment, the chimney may be thermally isolated from the side walls of the cabinet. The chimney may have an interior wall that is spaced from the side wall of the cabinet in order to provide isolation from the surface in contact with the insulation and to allow the side wall of the cabinet to create an additional reflective surface for reflecting heat back into the center of the cabinet.

The interior of the cabinet may include a plurality of racks for accepting food service trays or the like. In addition, the interior of the cabinet is preferably shaped to accept food trays.

Further features and advantages of the present invention will become more apparent from the detailed description set forth below when taken in conjunction with the following drawings.

BRIEF DESCRIPTION OF THE DRAWINGS

FIGS. 8A and 8B are a cross sectional view of a mobile cabinet, and an enlarged view of an isolated cabinet chimney according to one embodiment.

DETAILED DESCRIPTION OF THE PREFERRED EMBODIMENTS

Overview

The example embodiments of the invention presented herein are directed to mobile heated or refrigerated cabinets. This is for convenience only, and is not intended to limit the application of the present invention. In fact, after reading the following description, it will be apparent to one skilled in the relevant art how to implement the following invention in alternative embodiments, involving, for example, mobile carts, storage containers, and refrigerators.

Figure 1A:
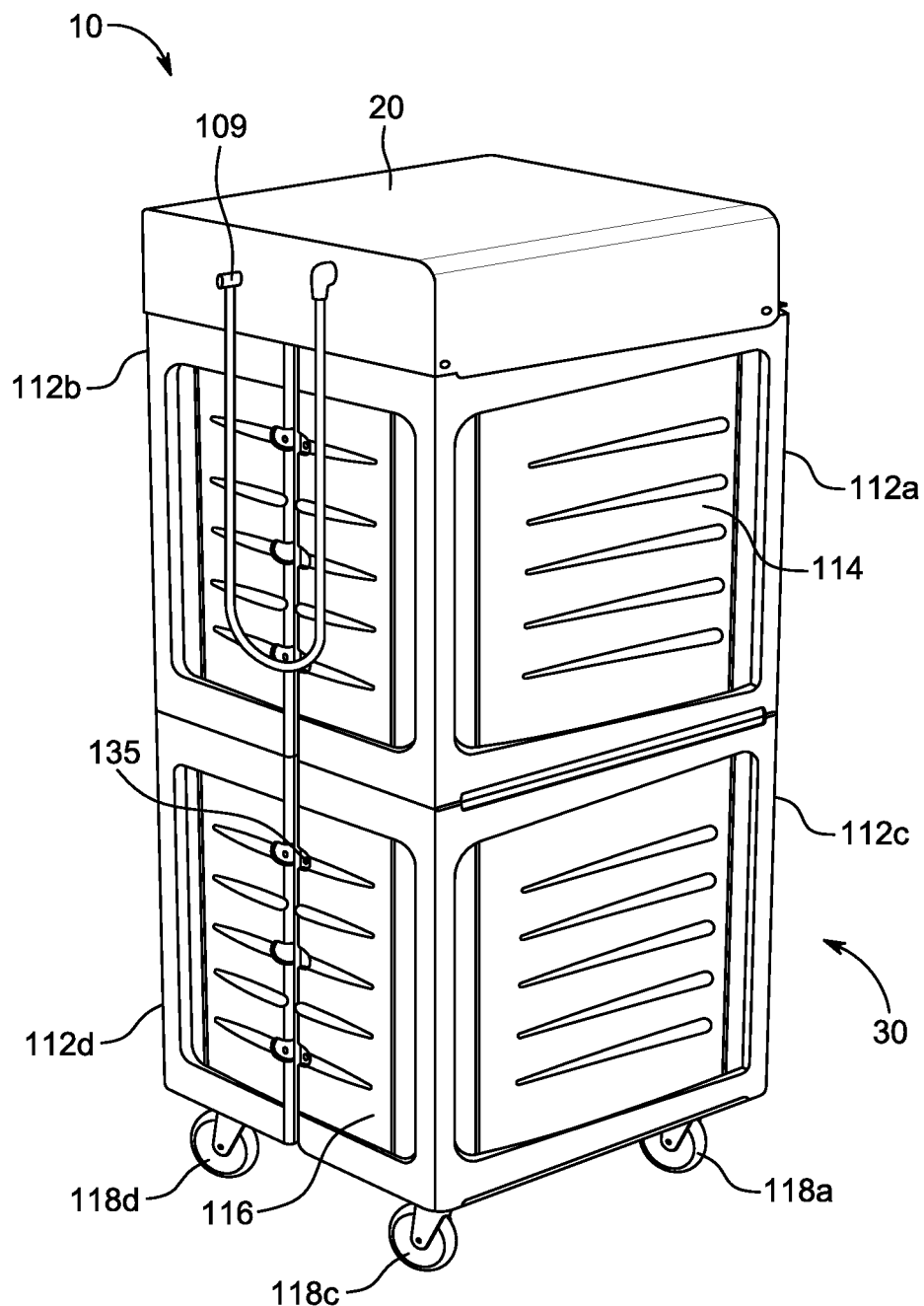
FIGS. 1A and 1B are external perspective views of a mobile cabinet according to one embodiment.
Figure 1B:
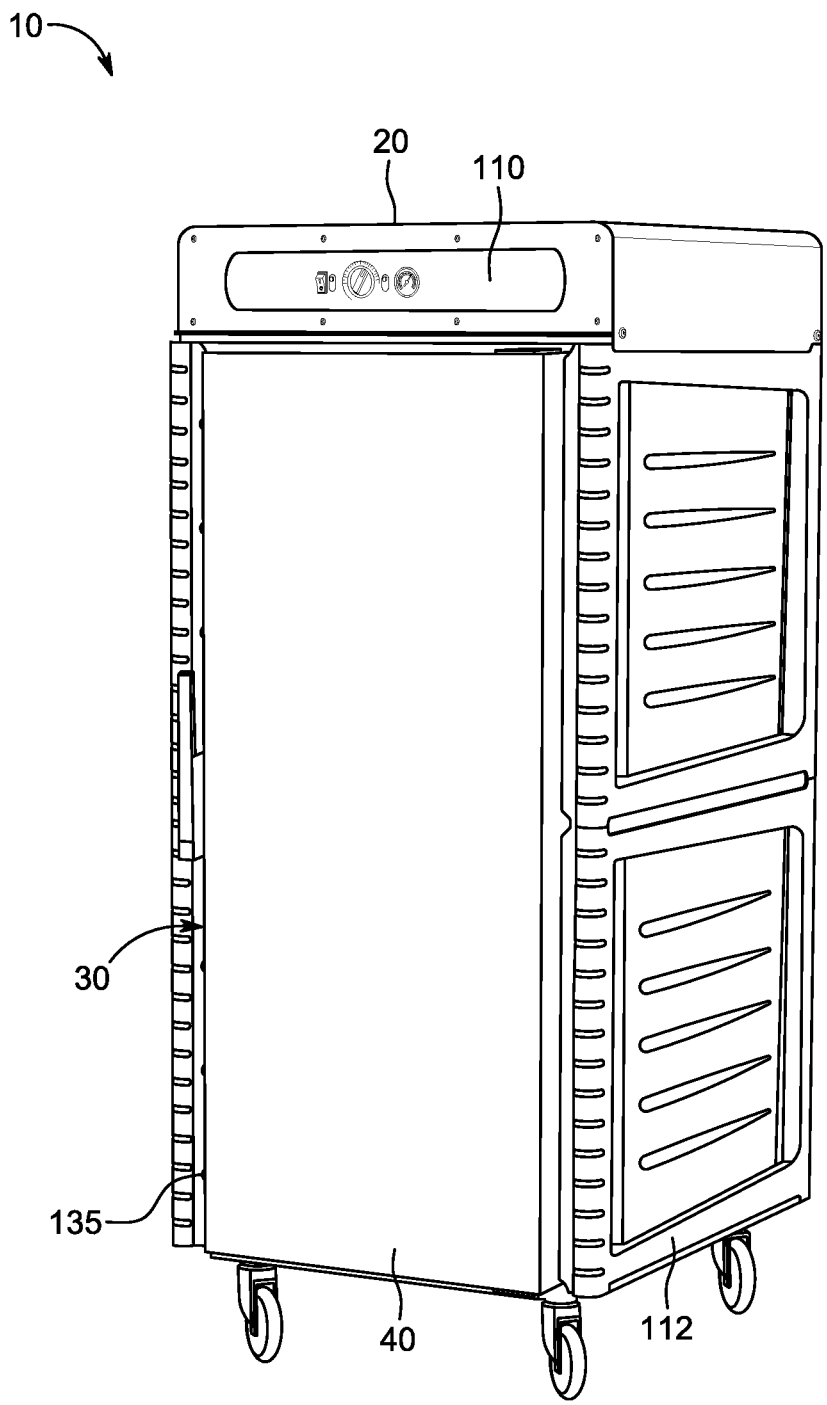

FIGS. 1A and 1B are perspective views of a mobile cabinet 10 according to one embodiment of the invention. The mobile cabinet 10 includes a heating or cooling module 20 located above a storage space 30. Alternatively, the storage space 30 may be located above the heating or cooling module 20. The storage space 30 is designed to store items, while the heating or cooling module 20 is designed to accommodate a heating or refrigeration system. The lower edge of the heating or cooling module 20 extends over the top of the upper insulation panels 112a and 112b.

The sides of the mobile cabinet 10 are wrapped with insulation panels around the storage space 30. In FIG. 1, the cabinet is wrapped with four insulation panels, each of which covers the top or bottom and right or left side of the storage space. The insulation panels 112 are each hinged panels, which include side wall sections 114 and rear wall sections 116. The side wall sections cover the side wall and include a flange portion which extends across a portion of the front of the cabinet near the door 40. The rear wall sections are coupled to the side wall sections by a hinge, and extend across a portion of the rear wall of the cabinet. As shown in FIG. 1A, the rear wall sections of the left and right insulation panels are both secured to the cabinet near the center of the rear wall of the cabinet.

Figure 2:
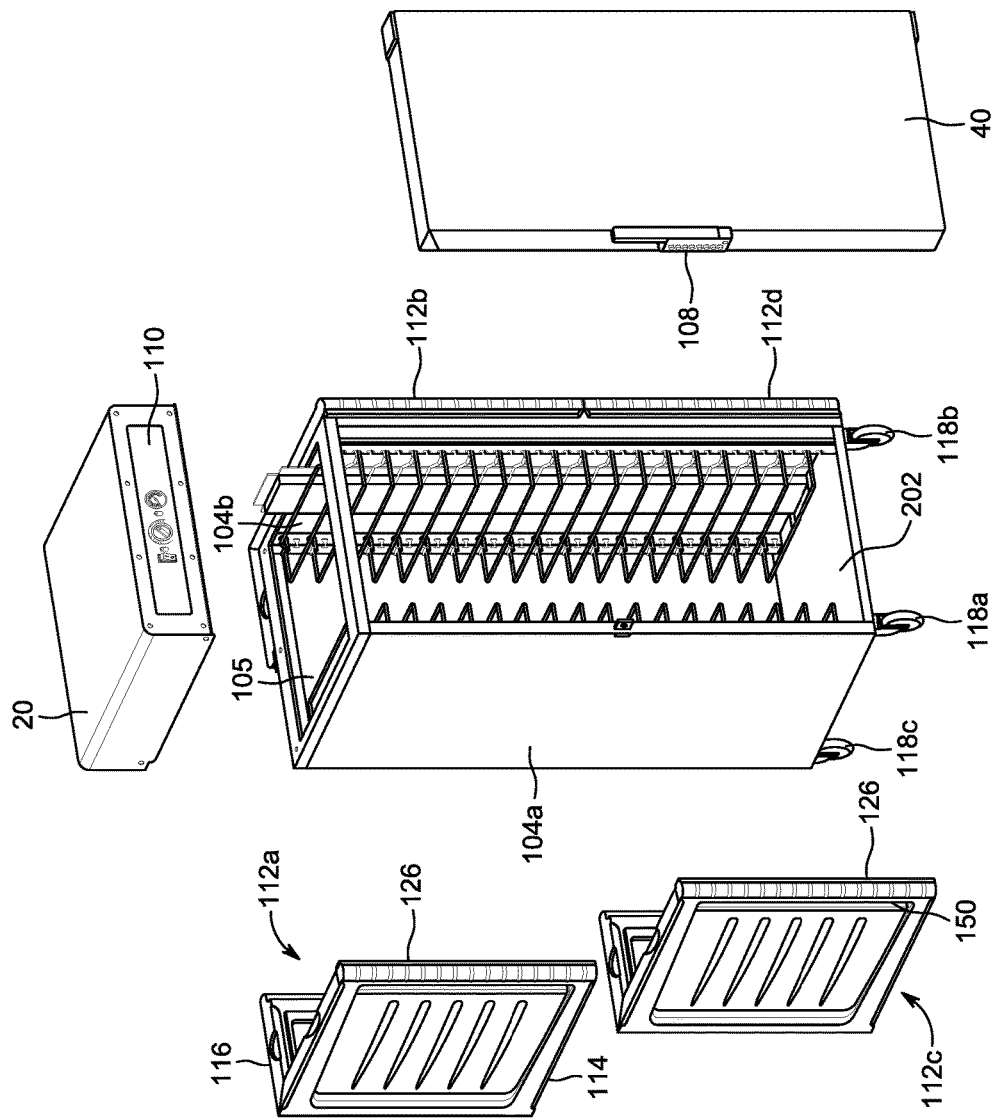
FIG. 2 is an exploded external perspective view of a mobile cabinet according to one embodiment.

FIG. 2 is an exploded external view of an exemplary embodiment of a mobile cabinet 10 according to the present invention. The mobile cabinet 10 includes: two sides walls 104a and 104b, a rear wall 105, a door 40 with a latch mechanism 108, an electrical connection port 109 (not shown in FIG. 2), a user interface 110, upper insulation panels 112a and 112b, casters 118a-d, lower insulation panels 112c-d, and insulation panel handles 150.

The door 40 is constructed from two pieces of sheet metal joined together around a skeletal structure which creates a door cavity. The door cavity is filled with an insulating material. In one embodiment, the insulator is polyurethane foam which is a poor conductor of heat. The polyurethane foam may be injected into the door cavity, resulting in a relatively homogenous distribution. One advantage of polyurethane foam, as compared to fiberglass insulation, is that the foam is sprayed into the door cavity and then rapidly expands to fill the cavity. The foam effectively blocks air migration through the door cavity. As a result, minimal, if any, heat transfer via convection through the door 40 itself occurs. When the polyurethane foam cures and hardens, it provides significant torsional rigidity and strength to the door 40. As a result, the door 40 skeletal structure is less extensive than conventional mobile refrigeration cabinets, resulting in an overall reduction in weight.

The side walls 104a and 104b, the rear wall 105, the upper wall (not shown in Fig), and an interior bottom wall 202 of the storage space 30, are also formed from sheet metal joined together. However, in order to reduce the costs and manufacturing time, it is preferable to not have to provide insulation within the walls of the cabinets. Rather, it is beneficial to create a separate insulation system that may be efficiently and cost-effectively constructed independently of the cabinet walls.

The insulation panels 112 are provided to protect and insulate the mobile cabinet 10 from impacts with external objects, as well as protect external objects (e.g., walls and doors), and to minimize temperature changes in the storage space 30. The heating or cooling module 20 is provided above the storage space and is able to push heated or cooled air into the storage space 30.

As shown in FIG. 2, the upper insulation panels 112a and 112b are provided on the left side wall 104a and the right side wall 104b, respectively, at a location below the heating or cooling module 20. The left and right side walls 104a-b may be formed of aluminum or stainless steel, in order to reflect heat within the storage space. The particular height of the insulation panels 112 may be adjusted based on the overall height of the mobile cabinet 10. For example, as shown in FIG. 2, the insulation panels 112a-d each may be provided to cover about 50% of the height of the walls of the mobile cabinet 10. This size is only exemplary, and depends upon the particular size of the mobile cabinet 10. For example, the insulation panels may span the entire height and/or width of the side walls 104a and 104b, or only a portion thereof.

Upper and lower insulation panels of different heights may be provided to accommodate a range of different sizes of cabinets without having to produce insulation panels with specific sizes for each size of cabinet. As shown in FIG. 2, the panels may be manufactured separately from the cabinet, and secured to the cabinet in the final stages of assembly. The insulation panels may also be added as an after-market addition to inefficient cabinets.

The insulation panels 112a-d may also be configured to extend beyond the width of the side walls 104a and 104b. As shown in FIGS. 3-6, the insulation panels 112 may include a flange portion 126. The flange portion 126 extends beyond the front end of the side walls 104a and 104b and wraps around the front corners of the mobile heated or refrigeration cabinet 10. As such, the insulation panels cover a portion of the front of the cabinet that is not covered by the door. When users of the cabinet engage the door, they are more likely to come into contact with this portion of the cabinet. As such, the flange portion provides important protection to the user to prevent possible burns. The flange also improves the insulation provided at this portion of the cabinet.

As shown in FIG. 2, the door 40 preferably includes a latch mechanism 108 comprising a striker which engages a corresponding receptacle formed in the side wall 104a. A cabinet may also be provided with multiple doors, which provide access to a portion of the storage space to reduce heat loss in cabinets which are accessed frequently. Preferably, at least two hinges and are provided to secure the door 40 to the side wall 104b. Depending upon the size of the mobile cabinet 10, three or more hinges may be provided. Furthermore, the flange portions 126 of the insulation panels 112b and 112d may include indentations to allow for the door hinges. The door 40 engages a door flange, which is disposed within the storage space 30 at such a position as to allow the door 40 to be flush with edges of the side walls 104a and 104b when the door 40 is closed. A door gasket may be attached to the side of the door flange which faces the door 40. The door gasket is compressed when the door 40 is closed and maintained in a compressed state by the engagement of the striker with the receptacle. This arrangement provides an effective barrier between the storage space 30 and the external environment, thus mitigating, if not preventing, air migration around the periphery of the door 40 when the door is closed.

As shown in FIGS. 1 and 2, the cabinet 10 also includes a user interface 110 which, in the preferred embodiment, is provided on the front of the cabinet in the heating or cooling module 20. The user interface 110 includes temperature controls which allow a user to raise or lower the temperature within the storage space 30. The user interface 110 may also include a writable surface area, preferably a dry erase surface, on which a user can display relevant messages, such as the contents of the mobile cabinet 10.

As shown in FIGS. 1 and 2, the exemplary mobile cabinet 10 includes a plurality of casters 118a, 118b, 118c, and 118d attached to the bottom wall of the cabinet (e.g., bottom of storage space). The plurality of casters 118a, 118b, 118c, and 118d allow the mobile cabinet 10 to move in any direction. While the plurality of casters 118a, 118b, 118c, and 118d may be directly attached to the bottom wall of the cabinet 10, the plurality of casters 118a, 118b, 118c, and 118d may also be attached to caster mounting brackets which in turn are connected to the bottom wall of the storage space and/or to the side walls 104a and 104b. The casters or caster mounting brackets may be connected to the bottom wall of the cabinet and/or the side walls 104a and 104b by any number of fasteners including, for example, rivets, nuts and bolts, and screws.

Each of the insulation panels 112 may be attached to the mobile cabinet 10 by any number of fasteners including, for example, nuts and bolts, rivets, and screws. The insulation panels may be formed with a plurality of mounting portions 135 to allow fasteners to engage with both the insulation panels and the cabinet body. The mounting portions 135 are preferably provided in at least the flange 126. In addition, mounting portions 135 may be in the rear wall section 116.

Figure 3:
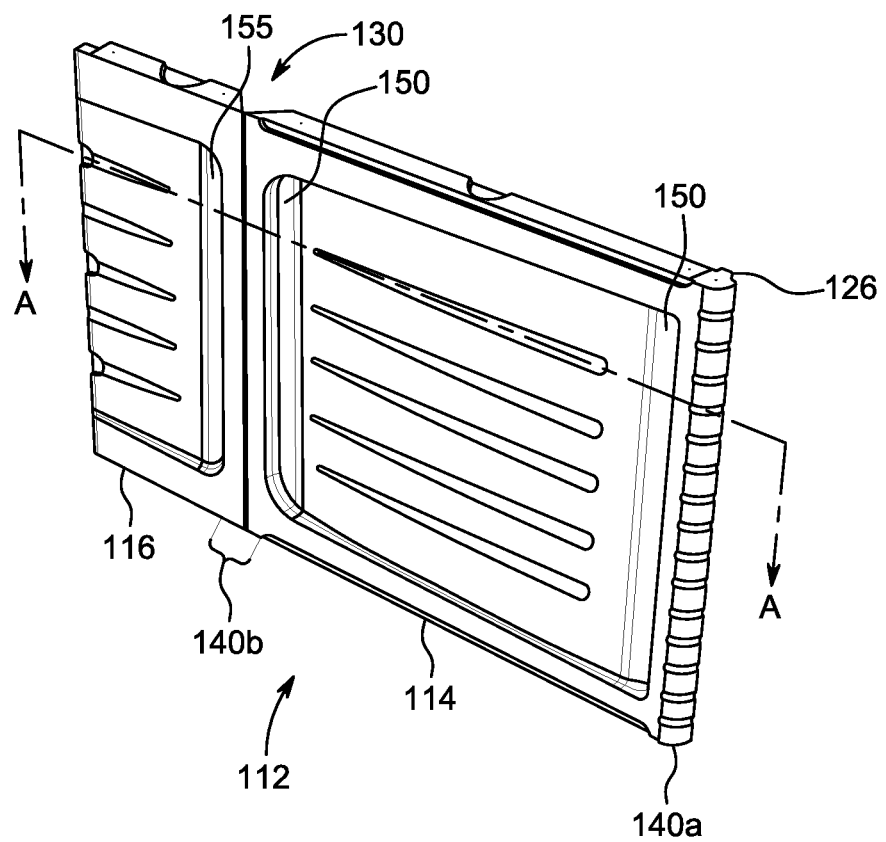
FIG. 3 is an external perspective view of an unfolded cabinet insulation panel according to one embodiment.

As shown in FIG. 3, insulation panels 112 may be initially formed as a flat, unfolded panel with an integral hinge 130 between the a side wall section 114 of the insulation panel and a back wall section 116 of the insulation panel. The hinge 130 may be formed as part of a solid structure integrally molded with the side wall section 114 and the back wall section 116. When flat, angled portions of the side wall section 114 and the back wall section 116, near the hinge, form a V-shaped gap that defines an angle of about 90 degrees. The side wall portion 114 may be integrally formed with the flange portion 126, which extends in a direction substantially perpendicular to the side wall section, in order to protect the portion of the front of the cabinet that is not protected by the door 40 from heat loss. The flange 126 also protects a cabinet user from potential burns.

Figure 4:
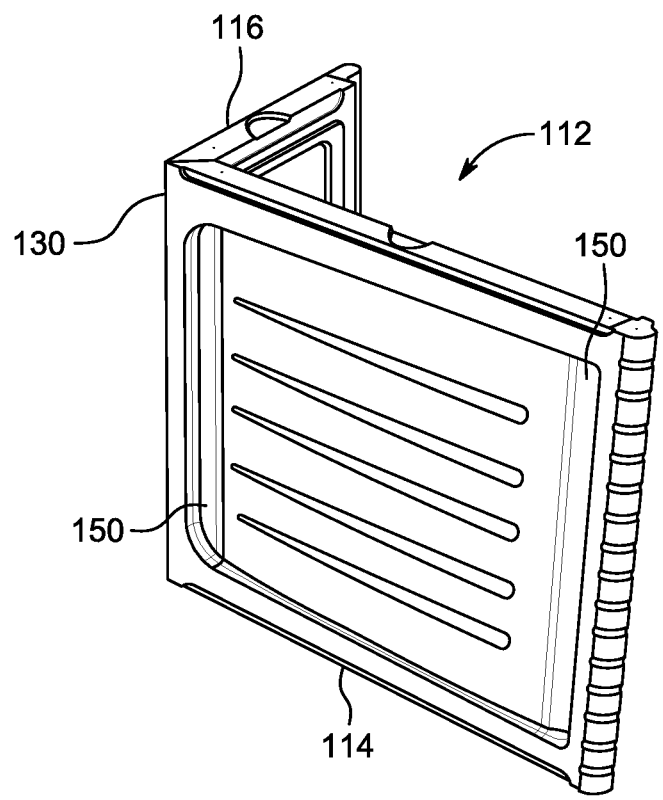
FIG. 4 is an external perspective view of a folded cabinet insulation panel according to one embodiment.

As shown in FIG. 4, the integral hinge 130 allows the side wall section 114 and the back wall section 116 of the insulation panel to be folded. When folded, the insulation panel may be secured to the side and rear walls of the cabinet without any significant exposed surfaces. In the exemplary embodiment, the outer corners 140a-b of the insulation panels are generally rounded, so as to protect the mobile cabinet 10, and any object it may collide with, regardless of the angle of impact. The outer corners 140a and 140b may extend beyond the exterior dimensions of the insulation panels 112 or, may have the same exterior dimensions equal to the width of the insulation panels 112. The folded insulation panel also lacks any exposed seams that may get caught against an object such as a door frame. As such, the hinge protects the insulation panel from possible damage. In a preferred embodiment, the side wall section 114 and back wall section 116 of the insulation panels 112 have the same maximum thickness, to provide substantially uniform insulation across the surfaces of the cabinet body.

Figure 5:
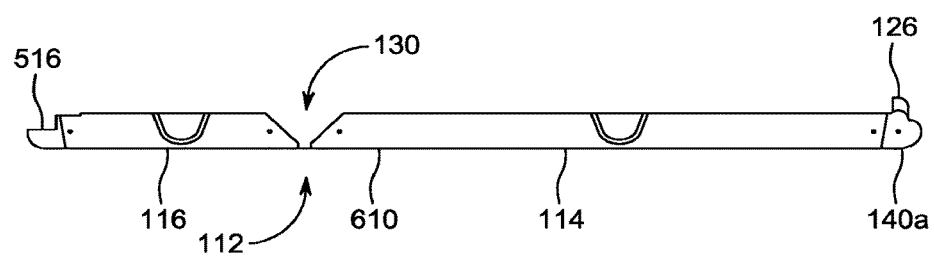
FIG. 5 is an external top view of an unfolded cabinet insulation panel according to one embodiment.

As shown in FIG. 5, the insulation panel may be provided with a cutout (or flange) 516 on the interior edge of the rear wall section 116. As shown in FIG. 8A, the cabinet may include a raised channel 820 on the back of the cabinet. The raised channel 820 allows features to be secured to the cabinet without penetrating the rear wall of the cabinet with fasteners, such as screws. The cutout 516 in the insulation panel allows the insulation panel 112 to be secured flush to the rear channel of the cabinet.

Figure 6:
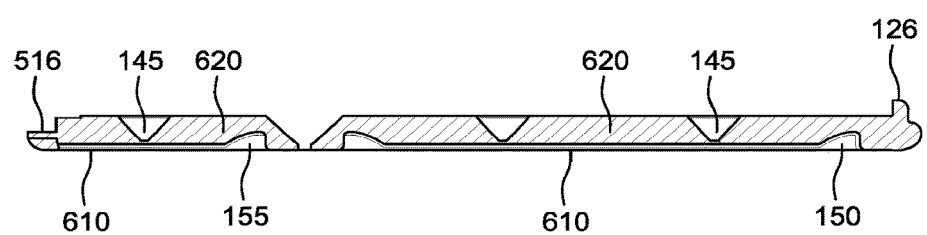
FIG. 6 is a cross-sectional top view of an unfolded cabinet insulation panel according to one embodiment.

In a preferred embodiment, as shown in detail in FIG. 6, the insulation panels 112 are provided with a handle 150 or plurality of handles formed as depressions within the sidewall section 114 of the insulation panels 112, to allow the user to better control the movement of the cabinet. In a preferred embodiment, another handle 155 may be formed within the back wall section 116 of the insulation panels 112. The handles are formed to allow a user to more securely engage with the cabinet when the cabinet is being moved and provides important protection to the user to prevent possible burns. In a preferred embodiment, the depth of the handle is no more than half of the maximum thickness of the insulation panels, to avoid the creation of pinch points in the blow molding and insulation filling processes.

As further shown in a cross-sectional view of FIG. 6, the insulation panels 112 may be formed with an outer shell 610 by a blow molding process. The outer shell is preferably formed of polyethylene. The outer shell 610 may then be filled with an insulator 620, such as polyurethane foam, to help maintain the desired temperature inside of the cabinet. In addition, mounting portions 145 may be provided in the insulation panels 112 to allow screws, or other fasteners, to attach the insulation panels 112 through the side and back walls of the cabinet 10. In a preferred embodiment, the mounting portions 145 are thermally isolated from the insulator 620, so that thermal energy is not conducted from any screws into the insulation panels so as to degrade the insulator 620.

The insulation panels are created with a shell and insulation in a cavity created in the shell in a multi-part process. A hinged panel may have separate cavities formed for a side wall section 114 and a back wall section 116. These cavities may also be injected with polyurethane foam. The cured polyurethane foam adds additional torsional rigidity and strength to the insulation panel. Accordingly, a skeletal structure of the cabinet body may be less extensive than in conventional mobile budget cabinets. Alternative materials, instead of sheet metal, may be also used to construct the mobile cabinet 10, such as, for example, carbon fiber, plastics, and fiber resins composites.

Figures 7A, 7B:
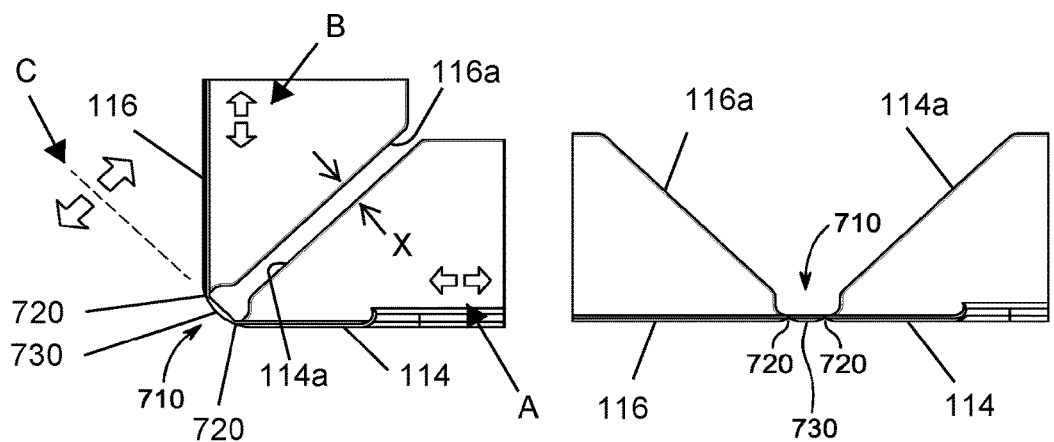
FIGS. 7A and 7B are enlarged cross-sectional views of an insulation panel double living hinge according to one embodiment.

FIGS. 7A and 7B show an enlarged view of the insulation panel hinge. In this embodiment, the hinge is a double living hinge 710 formed between the side wall section 114 and rear wall section 116 of the insulation panels 112. The double living hinge 710 is defined by two thin hinge portions 720 with a thicker portion or web 730 there between. The preferred thickness of the hinge portions 720 is in the range of 0.025 to 0.1 inches. More preferably, the thickness of the hinge portions 720 is in the range of 0.03 to 0.07 inches. In a preferred embodiment, the width of the hinge 710 is in the range of 0.3 to 0.4 inches. Then folded, the distance X between the angled portions 114a and 116a of the side wall section 114 and a back wall section 116 is preferably between 0.0 and 0.5 inches, and more preferably about 0.25 inches. The thin hinge portions 720 allow the panels 112 to be folded to be secured to the cabinet 10. As can be understood, each of the hinge portions 720 of double living hinge 710 is independently foldable. Thus, the side wall sections 114 and the back wall sections 116 can each move with respect to the other, as depicted by arrows A, B and C in FIG. 7A, to enable a close fit of the folded panels 112 to the side walls 104a, 104b and rear wall 105 of the cabinet 10. The folded panels 112 create a rounded seamless contour along the panel exterior, as shown in FIG. 7A. The seamless contour prevents possible snagging and tearing of the panels 112 if the cabinet accidentally collides with an object when being moved. As such, the hinged insulation panels help maintain insulation qualities of the cabinet over time.

Storage Space

Figure 9:
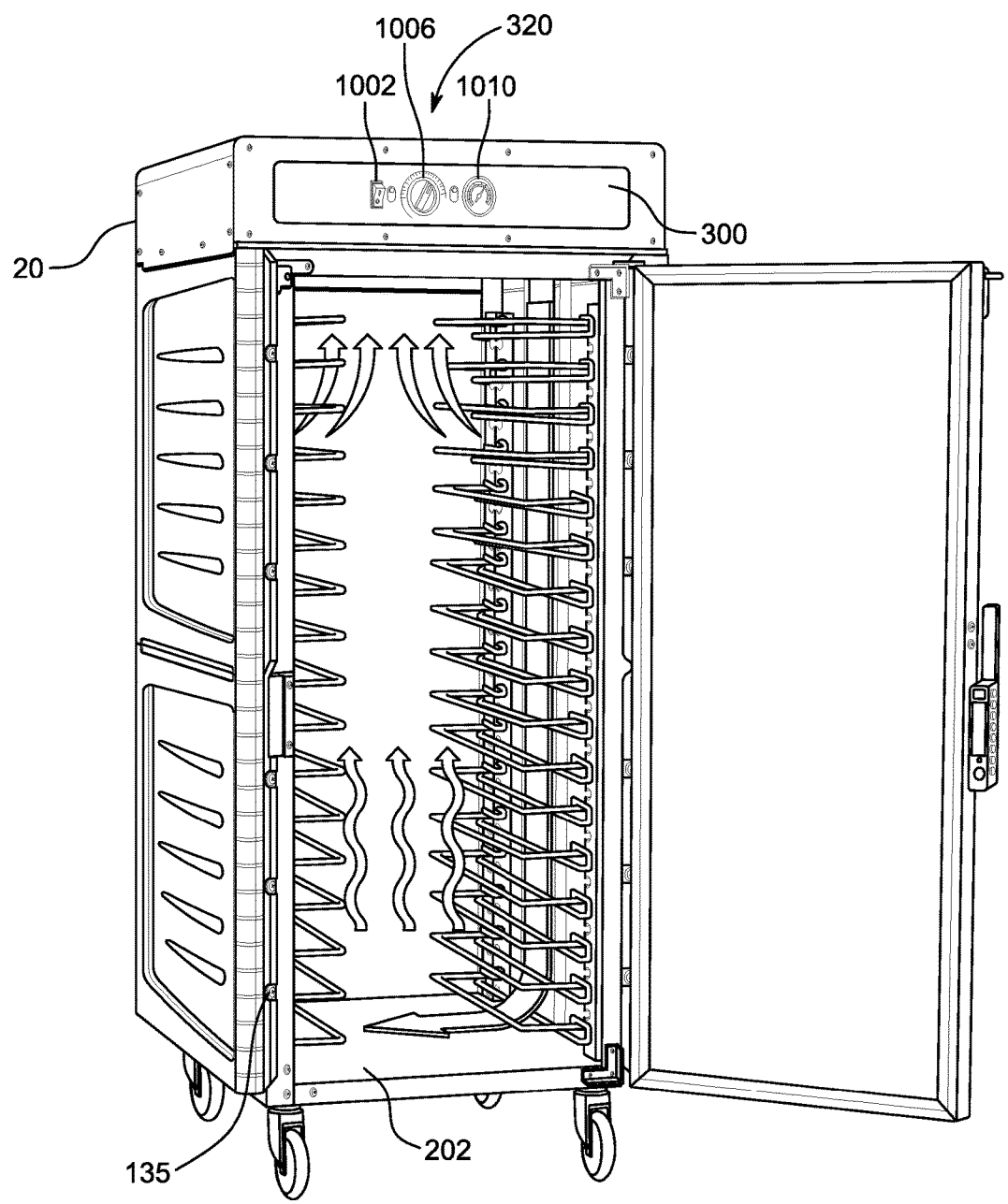
FIG. 9 is a perspective view showing heat flow in a mobile cabinet according to one embodiment.

FIGS. 8 and 9 illustrate the interior of the storage space 30. The heated or refrigerated space may include a plurality of mounting brackets which extend vertically within the storage space along the interior portions of the side walls 104a and 104b. At least two mounting brackets 830 may be provided along the interior portion of each side wall 104a and 104b, with one of the mounting brackets being located towards the front of the storage space 30, near the door 40, and the other mounting bracket being located towards the rear of the storage space 30. In one embodiment, the mounting brackets located near the door 40 lie substantially within the same plane. Similarly, the mounting brackets located near the rear of the storage space 30 also lie substantially within the same plane.

Each of mounting brackets 830 includes a slot which is configurable to receive a platform support element 840, which is adjustable in the vertical direction over the height of the mounting bracket. The platform support element includes a support portion 860 configured to engage a shelf or tray. A plurality of platform support elements may be provided for each mounting bracket and engaged thereto. In addition, a group of platform support elements disposed in respective mounting brackets may be arranged to lie substantially in the same horizontal plane, so as to support a shelf or tray which rests upon the group of platform support elements.

As shown in FIGS. 8A and 8B, the side walls 104 of the storage space 30 include a chimney 214 with an opening 204. The chimney is located between the front and rear mounting brackets and interior to any platform support elements provided on the interior of the side walls. The chimney 214 allows air to flow from the heating or cooling module down to the bottom of the cabinet; or allows air to flow upwards from a bottom mounted heating or cooling module. In a preferred embodiment, the chimney 214 is spaced from the side wall 104 of the cabinet, creating an air gap, in order to better thermally isolate the air in the chimney from the insulation panels. In a preferred embodiment, the air gap between the chimney and the cabinet wall is at least ⅜ of an inch. When the chimney is spaced from the side wall, the side wall of the cabinet and insulation panels are also better able to reflect thermal energy from the chimney back into the cabinet and protect the insulation 620 and insulation panel 112 from thermal degradation.

As shown in FIG. 9, the bottom wall 202 of the storage space 30 includes an air intake opening 204 where the chimney engages with the heating or cooling module and an output opening 206 proximate to the bottom of the cabinet. In a preferred embodiment, a heating module can force heated air down through the chimney to the bottom of the cabinet. The heated air will then rise throughout the cabinet, as shown by the air flow arrows of FIG. 9. The air intake opening 204 allows the heating or refrigeration system 300 to supply the storage space 30 with air at a regulated temperature. In the exemplary embodiment, the air intake opening 204 is rectangular; however, other shapes may be used. As shown in FIGS. 8A and 9, the chimney 214 may be attached to the interior portion of the side wall 104b by fasteners such as, for example, rivets, screws, and nuts and bolts.

Figure 10:
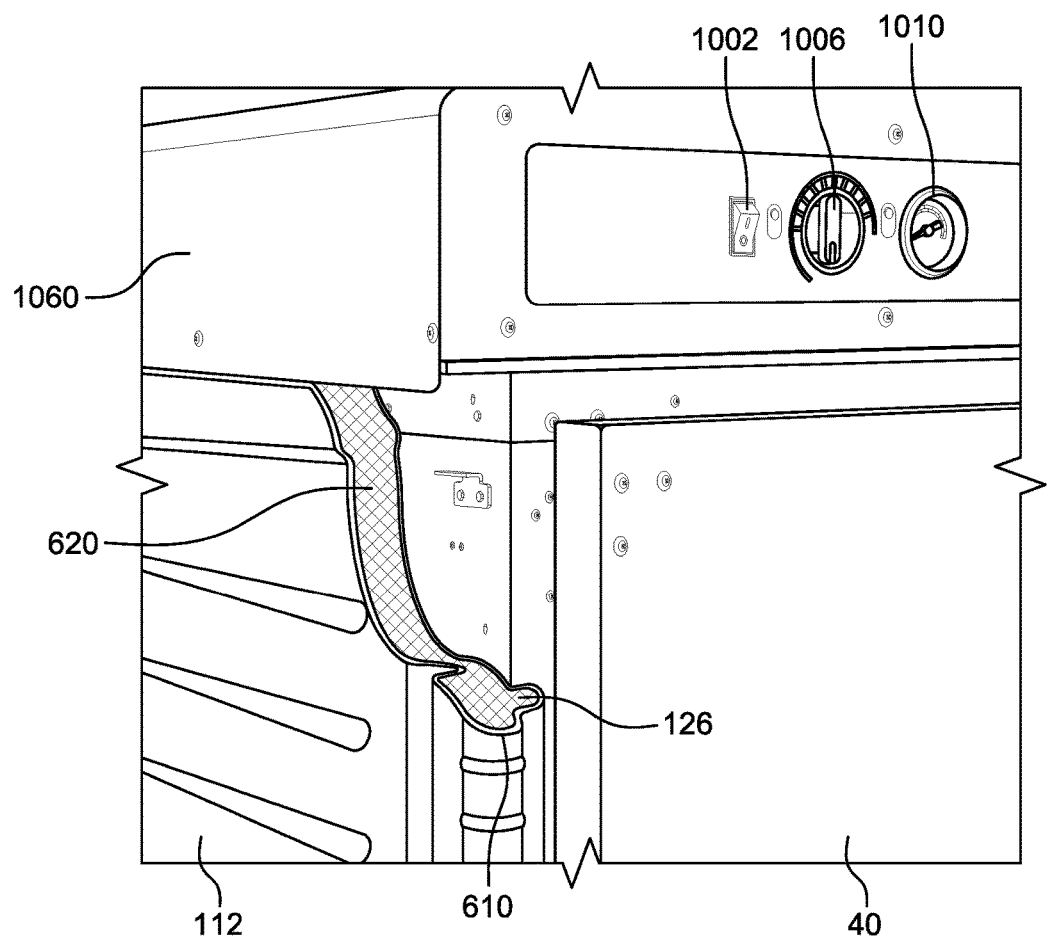
FIG. 10 is a perspective view of one corner of a mobile cabinet with a cutaway of a side panel according to one embodiment.

The heating or cooling module space 20 is designed to accommodate the heating or refrigeration system 300. As one of ordinary skill in the art will appreciate, the heating or refrigeration system 300 may include an AC power connection (not shown), and a control unit 320. The control unit 320 may include a power switch 1002, a temperature controller 1006, and a thermometer 1010. As shown in FIG. 10, the cover 1060 of the heating or cooling module space 20 may extend to cover the top on the upper insulation panels. This allows the cover 1060 to help secure the insulation panels to the body of the cabinet.

Figure 11:
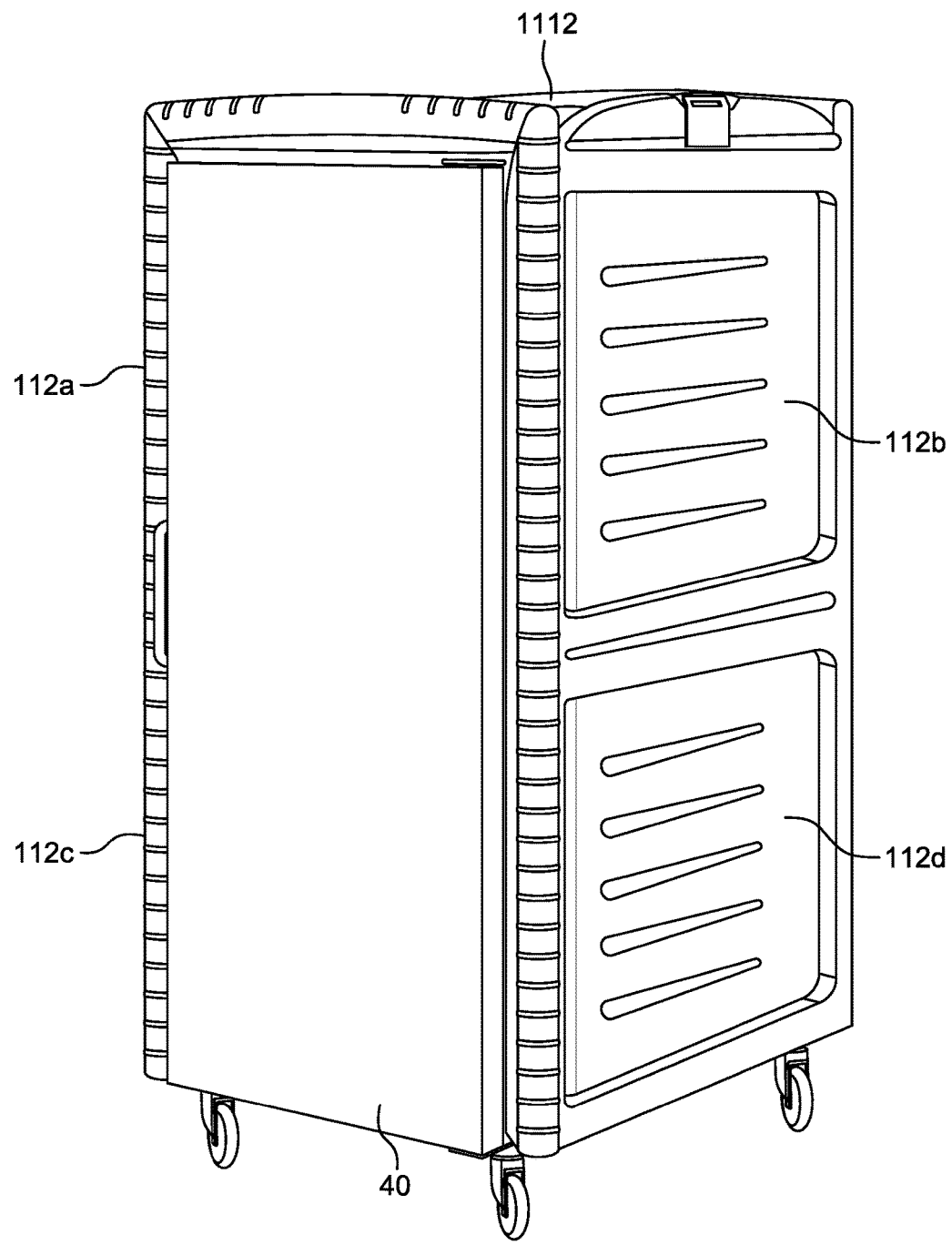
FIG. 11 is a perspective view of an ambient mobile cabinet without a heating or cooling module according to one embodiment.

The cabinet may also be provided without a heating or cooling unit. The cabinet may instead be provided with an air circulation system. In yet another embodiment, the cabinet may be provided without any powered component. In such an embodiment, the cabinet may be provided with an additional top insulation panel 1112 as shown in FIG. 11. This top insulation panel is provided in substantially the same position as the heating or cooling module 20. The top insulation panel is formed in the same manner as the side insulation panels to cover the top of the cabinet.

While various example embodiments of the invention have been described above, it should be understood that they have been presented by way of example, and not limitation. It is apparent to persons skilled in the relevant art(s) that various changes in form and detail can be made therein.

Thus, the disclosure should not be limited by any of the above-described example embodiments.

In addition, it should be understood that the figures are presented for example purposes only. The architecture of the example embodiments presented herein is sufficiently flexible and configurable, such that it may be utilized and navigated in ways other than that shown in the accompanying figures.

The invention claimed is:

1. A mobile cabinet comprising:
  a cabinet body including a front, first and second side walls and a back wall, each of the first and second side walls having a depth, and the back wall having a width;
  a door attached to the front of the cabinet body; and
  two insulation panels attachable to the cabinet body;
  wherein each of the insulation panels includes a side wall section, a back wall section, a hinge comprising a first hinge portion and a second hinge portion connecting the side wall section and the back wall section, and a flange that projects perpendicularly from a front edge of a respective side wall, opposite the hinge;
  wherein the side wall section includes an angled surface proximate to the first hinge portion and the back wall section includes an angled surface proximate to the second hinge portion; and
  wherein the side wall section and the back wall section of each of the insulation panels is, respectively, folded about the first hinge portion and the second hinge portion in an L-shape and each insulation panel wraps the cabinet body over a portion of the front of the cabinet body that is proximate to the door, a depth of one of the first and second side walls and a portion of the width of the back wall, and the respective angled surfaces of the side wall section and the back wall section are spaced apart by a distance;
  wherein the flange extends beyond a front end of the respective side wall and wraps around the front corner to cover a portion of the front of the cabinet body that is proximate to the door; and
  wherein the insulation panel comprises a rounded seamless surface on an exterior side of the insulation panel at the hinge.

2. The mobile cabinet of claim 1, wherein each insulation panel includes at least one hand hold integrally formed in the side wall section.

3. The mobile cabinet of claim 1, wherein the hinge in each insulation panel is integrally formed with the side wall section and the back wall section.

4. The mobile cabinet of claim 1, wherein the side wall section, the back wall section, and the hinge of each insulation panel are integrally formed, and wherein each of the side wall section and the back wall section defines a cavity that is filled with an insulating material.

5. The mobile cabinet of claim 4, wherein the hinge, the side wall section, and the back wall section are formed by a one of a blow molding process and a rotational molding process.

6. The mobile cabinet of claim 1, wherein the back wall section of each insulation panel includes a flange that projects from a side of the back wall section opposite the hinge.

7. The mobile cabinet of claim 1, wherein the hinge is an integrally molded section attaching the side wall section to the back wall section so as to space apart the side wall section and back wall section from each other when the insulation panel is laid flat.

8. The mobile cabinet of claim 7, wherein the first hinge portion and the second hinge portion are connected by a web portion
  wherein the the rounded seamless surface on the exterior side of the insulation panel comprises the web portion.

9. The mobile cabinet of claim 8, wherein the first hinge portion and second hinge portion enable the side wall section and the back wall section to move independently from one another and in a direction perpendicular to one another when the insulation panel is folded in the L-shape.

10. A mobile cabinet comprising:
  a cabinet body including a front, a side wall and a back wall;
  a door attached to the front of the cabinet body; and
  at least one insulation panel attachable to the cabinet body for covering at least a portion of both the side wall and the back wall of the cabinet body, the insulation panel comprising a side wall section, a back wall section, and a double living hinge integrally formed with, disposed between and connecting the side wall section and the back wall section;
  wherein the hinge comprises a first hinge portion and a second hinge portion that are connected by an intermediate web portion, wherein the first hinge portion the second hinge portion and the web portion cooperatively enable independent movement of the side wall section in a direction parallel to the side wall and the back wall section in a direction parallel to the back wall while attaching the insulation panel to the cabinet body;
  wherein an exterior surface of the insulation panel at the hinge comprises a rounded seamless surface comprising the web portion; and
  wherein the insulation panel further comprises means for preventing burns to a user located at the front of the cabinet body proximate to the door.

* * * * *